United States Patent
Czyszczewski et al.

(10) Patent No.: US 7,599,556 B2
(45) Date of Patent: Oct. 6, 2009

(54) APPARATUS, SYSTEM, AND METHOD FOR SCANNING SEGMENTATION

(76) Inventors: Joseph Stanley Czyszczewski, 4501 Nelson Rd., #2304, Longmont, CO (US) 80503; Hong Li, 315 Onyx Way, Boulder, CO (US) 80027; James T. Smith, II, 4660 Bedford Ct., Boulder, CO (US) 80301

( * ) Notice: Subject to any disclaimer, the term of this patent is extended or adjusted under 35 U.S.C. 154(b) by 636 days.

(21) Appl. No.: 11/212,371

(22) Filed: Aug. 25, 2005

(65) Prior Publication Data

US 2007/0047812 A1 Mar. 1, 2007

(51) Int. Cl.
- G06K 9/34 (2006.01)
- G06K 9/62 (2006.01)
- G06K 15/00 (2006.01)

(52) U.S. Cl. .................. 382/173; 382/105; 382/168; 382/224; 358/2.1; 358/465

(58) Field of Classification Search ......... 382/100–101, 382/105, 159–161, 164, 168–181, 190–195, 382/224–229; 358/1.9–3.24, 465–466
See application file for complete search history.

(56) References Cited

U.S. PATENT DOCUMENTS

| | | | | |
|---|---|---|---|---|
| 4,926,251 A | * | 5/1990 | Sekizawa et al. | 358/535 |
| 4,937,682 A | * | 6/1990 | Dalton | 358/461 |
| 5,073,953 A | * | 12/1991 | Westdijk | 382/176 |
| 5,125,045 A | * | 6/1992 | Murakami et al. | 382/270 |
| 5,465,308 A | * | 11/1995 | Hutcheson et al. | 382/159 |
| 5,539,843 A | * | 7/1996 | Murakami et al. | 382/270 |
| 5,642,473 A | | 6/1997 | Klotz, Jr. | 395/117 |
| 5,696,842 A | * | 12/1997 | Shirasawa et al. | 382/176 |
| 5,696,843 A | | 12/1997 | Miyaza | 382/176 |
| 5,729,632 A | * | 3/1998 | Tai | 382/237 |
| 5,731,823 A | * | 3/1998 | Miller et al. | 347/5 |
| 5,751,850 A | | 5/1998 | Rindtorff | 382/178 |
| 5,754,709 A | * | 5/1998 | Moriya et al. | 382/274 |
| 5,767,978 A | * | 6/1998 | Revankar et al. | 358/296 |
| 5,787,194 A | | 7/1998 | Yair | 382/173 |

(Continued)

FOREIGN PATENT DOCUMENTS

EP 1024656 A2 8/2000

(Continued)

OTHER PUBLICATIONS

D. Barba, et al., "Automatic Document Segmentation", IBM Technical Disclosure Bulletin, vol. 31 No. 7 Dec. 1988, pp. 73-74.

Primary Examiner—Daniel G Mariam
Assistant Examiner—Manav Seth
(74) Attorney, Agent, or Firm—Duft Bornsen & Fishman, LLP (57) ABSTRACT

An apparatus, system, and method are disclosed for identifying content within a scanned document. The apparatus includes a modification module, an identification module, and a segmentation module. The modification module creates a modified content data set through application of a sigmoid function to a scanned content data set. The identification module identifies a content segment within the modified content data set. The segmentation module identifies a content segment type of the content segment. Exemplary content segment types include text, line art, and images.

18 Claims, 7 Drawing Sheets

U.S. PATENT DOCUMENTS

| | | | | |
|---|---|---|---|---|
| 5,796,869 A * | 8/1998 | Tsuji et al. | | 382/203 |
| 5,809,167 A | 9/1998 | Al-Hussein | | 382/190 |
| 5,812,695 A * | 9/1998 | Dawe | | 382/176 |
| 5,841,903 A | 11/1998 | Kikuchi | | 382/203 |
| 5,852,677 A * | 12/1998 | Nakamura et al. | | 382/173 |
| 5,857,030 A * | 1/1999 | Gaborski et al. | | 382/132 |
| 5,884,296 A * | 3/1999 | Nakamura et al. | | 706/20 |
| 5,892,843 A * | 4/1999 | Zhou et al. | | 382/176 |
| 5,956,468 A * | 9/1999 | Ancin | | 358/1.9 |
| 5,970,164 A * | 10/1999 | Bamberger et al. | | 382/128 |
| 6,028,956 A * | 2/2000 | Shustorovich et al. | | 382/156 |
| 6,078,697 A * | 6/2000 | Ng | | 382/275 |
| 6,195,459 B1 | 2/2001 | Zhu | | |
| 6,233,353 B1 * | 5/2001 | Danisewicz | | 382/176 |
| 6,324,309 B1 * | 11/2001 | Tokuyama et al. | | 382/300 |
| 6,377,711 B1 * | 4/2002 | Morgana | | 382/274 |
| 6,390,583 B1 * | 5/2002 | Kato et al. | | 347/15 |
| 6,522,424 B1 | 2/2003 | Nakahara et al. | | 358/1.17 |
| 6,594,401 B1 * | 7/2003 | Metcalfe et al. | | 382/275 |
| 6,625,312 B1 * | 9/2003 | Nagarajan et al. | | 382/176 |
| 6,633,411 B1 | 10/2003 | Rao et al. | | 358/2.1 |
| 6,678,346 B2 | 1/2004 | Hsieh | | 378/4 |
| 6,679,583 B2 | 1/2004 | Vanhooydonck et al. | | 347/41 |
| 6,680,782 B1 * | 1/2004 | Jamzadeh | | 358/1.14 |
| 6,697,536 B1 | 2/2004 | Yamada | | 382/275 |
| 6,738,154 B1 * | 5/2004 | Venable | | 358/1.15 |
| 6,741,753 B1 * | 5/2004 | Moroney | | 382/274 |
| 6,826,316 B2 * | 11/2004 | Luo et al. | | 382/305 |
| 6,934,057 B1 * | 8/2005 | Namizuka | | 358/2.1 |
| 7,024,049 B2 * | 4/2006 | Bern et al. | | 382/254 |
| 7,158,686 B2 * | 1/2007 | Gindele | | 382/274 |
| 7,245,398 B2 * | 7/2007 | Namizuka | | 358/2.1 |
| 7,450,268 B2 * | 11/2008 | Martinez et al. | | 358/1.9 |
| 7,460,268 B2 * | 12/2008 | Goto et al. | | 358/1.9 |
| 2003/0202708 A1 | 10/2003 | Renshaw et al. | | 382/243 |
| 2004/0081369 A1 * | 4/2004 | Gindele et al. | | 382/274 |
| 2005/0100242 A1 | 5/2005 | Trifonov et al. | | 382/274 |
| 2005/0281573 A1 * | 12/2005 | Kitagawa et al. | | 399/49 |
| 2006/0082831 A1 * | 4/2006 | Gotoh et al. | | 358/3.06 |
| 2007/0047805 A1 * | 3/2007 | Ohtsu | | 382/164 |
| 2008/0199076 A1 * | 8/2008 | Matsuoka et al. | | 382/176 |

FOREIGN PATENT DOCUMENTS

JP 3139783 A 6/1991

* cited by examiner

APPARATUS, SYSTEM, AND METHOD FOR SCANNING SEGMENTATION

BACKGROUND

1. Field of Art

This invention relates to scan image segmentation and more particularly relates to identifying text, image, and line-art content within a scanned document.

2. Background Technology

Conventional digitization of hardcopy documents, such as out-of-print books, is slow and difficult. In part, the difficulty results from the need to identify various types of content within a given document. Some typical content types are text, images, and line art. Text generally includes small characters or symbols that are of a consistent size. Line art generally includes drawings of lines and patterns. Images generally include pictures with many intermediate levels (such as gray) to portray some picture. Text and line art are substantially bi-level (e.g. black and white). In contrast, images have more gray levels (e.g. 256 levels in an 8-bit system) in the form of halftones (e.g. spatially distributed high resolution pixels that approximate an intermediate color or shade, such as gray).

The term "scanned content" is used herein to refer to any content that is scanned and digitized. The term "image content" refers to a particular type of content, halftone images, within a scanned content. Other types of content include text and line art, as indicated above. In order to maintain quality reproduction of scanned content, different content types may be processed in different ways. However, in order to process different content types in different ways, each content type may need to be identified first.

One conventional scanning technology employs manual identification of different content types within a document. For example, a person physically draws a rectangular bounding box or other identifier around a content segment to indicate that the circumscribed contents should be processed in a certain way. A content segment refers to a section of the scanned document or scanned content that is of a consistent content type. Content that is outside of the bounding box may be processed according to a default processing mode. So, in one example, a person may draw a rectangular bounding box around a halftone image segment, but not around a text segment. The halftone image may be descreened to remove the halftones and the text may be simply scaled up to higher resolution and threshold into bi-level. Conventional descreening employs an algorithm to smooth halftones into a contone image. Unfortunately, this conventional method of drawing rectangular bounding boxes around images is slow and costly.

Another conventional scanning technology employs local optimization. Local optimization uses local information in the scanned content to determine if a content segment should be treated as bi-level text and line art or a halftone image. However, local optimization does not have enough information to segment the scanned document into individual content segments that can be processed differently according to the content type of each segment. As a result, local optimization scanning technologies can result in decreased image quality.

From the foregoing discussion, it should be apparent that a need exists for an apparatus, system, and method that overcome the limitations of conventional scanning segmentation technologies. Beneficially, such an apparatus, system, and method would be faster and simpler than manual segmentation. Additionally, such an apparatus, system, and method would be more accurate than local optimization technologies.

SUMMARY

The several embodiments of the present invention have been developed in response to the present state of the art, and in particular, in response to the problems and needs in the art that have not yet been fully solved by currently scanning segmentation technologies. Accordingly, the present invention has been developed to provide an apparatus, system, and method for scanning segmentation that overcome many or all of the above-discussed shortcomings in the art.

Embodiments of this invention facilitate scanning segmentation. In particular, certain embodiments automate scanning segmentation, including identification of segments and the content type of each segment.

The apparatus to identify content within a scanned content is provided with a logic unit containing a plurality of modules configured to functionally execute the necessary operations for scanning segmentation. These modules in the described embodiments include an image module, a modification module, an identification module, a segmentation module, an area calculation module, an area comparison module, a sub-image module, a histogram calculation module, a histogram comparison module, and a neighborhood module.

In one embodiment, the image module accesses the scanned content data set. The scanned content data set may serve as a basis for the modified content data set, which in turn may be used to identify the potential content types of the scanned content.

In one embodiment, the modification module creates the modified content data set from the scanned content data set. In order to create the modified content data set, the modification module may apply a mathematical function to the scanned content data set. In one embodiment, the modification module applies a sigmoid function to the scanned content data set in order to create the modified content data set.

In one embodiment, the identification module identifies a content segment within the modified content data set. The identification module may employ an eight neighbor connectedness determination to identify a content segment of the modified content data set.

In one embodiment, the segmentation module identifies a content segment type of a content segment within the modified content data set. Correspondingly, the segmentation module identifies a content segment type of a content segment of the scanned content data set. In one embodiment, the segmentation module identifies the content segment type of the content segment as text in response to a determination that a calculated segment surface area is less than a predefined minimum image surface area.

In one embodiment, if the segment surface area is not less than the predefined minimum image surface area then the segmentation module identifies the content segment type of the content segment as line art in response to a determination that a modified content histogram is similar to a scanned content histogram. Otherwise, the segmentation module may identify the content segment type of the content segment as image in response to a determination that the modified content histogram is not similar to the scanned content histogram. Alternatively, the segmentation module may identify the content segment type as another content type.

In one embodiment, the area calculation module calculates a segment surface area of a content segment within the modified content data set. In one embodiment, the area comparison module compares the calculated segment surface area of a content segment to a predefined minimum image surface area.

In one embodiment, the sub-image module defines a sub-image window inclusive of a content segment whose size is determined to be equal to or larger than the minimum image surface area. The sub-image window may be used to identify a portion of the data of the modified content data set or a corresponding portion of the scanned content data set. In one embodiment, the sub-image window may be rectangular, having a width and a height approximately equal to, but slightly greater than, the calculated width and height of the selected content segment. Alternatively, the sub-image window may employ other shapes of various size or contour.

In one embodiment, the histogram calculation module calculates a scanned content histogram descriptive of the scanned content data set. In particular, the histogram calculation module may calculate a scanned content histogram corresponding to the sub-image window applied to the scanned content data set. Similarly, the histogram calculation module may calculate a modified content histogram corresponding to the sub-image window applied to the modified content data set. In one embodiment, the histogram comparison module compares the modified content histogram to the scanned content histogram.

In one embodiment, the neighborhood module converts a predefined range of pixel values to a single pixel value within the predefined range. In other words, the neighborhood module assigns a single pixel value to each pixel within a certain group of pixel values. The neighborhood module may perform such grouping operations on a modified content data set corresponding to either a single color channel or multiple color channels.

A system of the present invention is also presented to identify content within a scanned content. The system may be embodied in a scanner system having a scanner, an electronic storage device, and a segmentation apparatus. The scanner captures and digitizes a scanned content having a content segment. The electronic data storage device stores a scanned content data set descriptive of the digitized scanned content. The segmentation apparatus identifies a content segment type of the content segment. The system also may include a user interface, a capture module, and a digitization module.

A signal bearing medium is also presented to store a program that, when executed, performs operations to identify content within a scanned content. In one embodiment, the operations include creating a modified content data set through application of a sigmoid function to a scanned content data set, identifying a content segment within the modified content data set, and by comparing the data between modified scan data and original scan data.

In further embodiments, the operations may include determining eight neighbor connectedness with a substantially black pixel and to identify all of the pixels within the content segment. In further embodiments, the operations may include calculating a segment surface area of a content segment within the modified content data set, comparing the segment surface area to a minimum image surface area, and/or identify the content segment type of the content segment as text in response to a determination that the segment surface area is less than the minimum image surface area.

In further embodiments, the operations may include defining a sub-image window inclusive of the content segment in response to a determination that the content segment is not text, calculating a scanned content histogram corresponding to the sub-image window, calculating a modified scanned content histogram corresponding to the sub-image window, and/or comparing the modified scanned content histogram to the scanned content histogram. In further embodiments, the operations may include identifying the content segment type of the content segment as line art in response to a determination that the modified scanned content histogram is similar to the scanned content histogram, identifying the content segment type of the content segment as image in response to a determination that the modified scanned content histogram is not similar to the scanned content histogram, and/or converting a predefined range of pixel values to a single pixel value within the predefined range of pixel values.

Advantageously, the presented embodiments automatically identify segments of a scanned content and identify the content type of each segment. Identification of the content types of the individual segments facilitates appropriate processing of each segment according to its content type. Additionally, such scanning segmentation increases the quality of scanning digitization and reproduction.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete segments. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
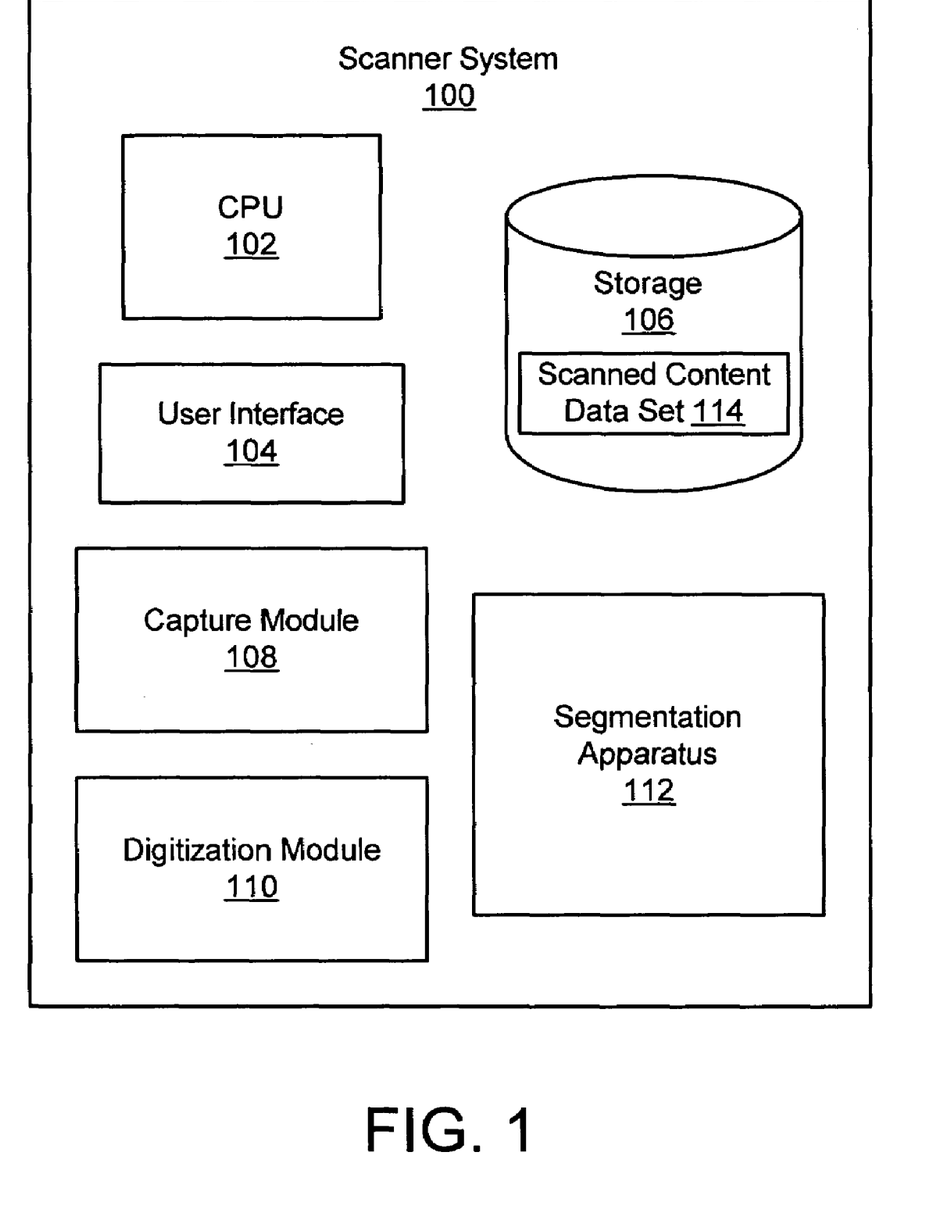
FIG. 1 is a schematic block diagram illustrating one embodiment of a scanner system.

FIG. 1 depicts one embodiment of a scanner system 100. The illustrated scanner system 100 includes a central processing unit (CPU) 102, a user interface 104, and an electronic storage device 106. The illustrated scanner system 100 also includes a capture module 108, a digitization module 110, and a segmentation apparatus 112.

The CPU 102 processes arithmetic and logical operations, as well as control instructions. In one embodiment, the user interface 104 includes hardware and software to facilitate entry of user commands into the scanner system 100, as well as display or otherwise communicate information from the scanner system 100 to the user. The user interface 104 may include hardware, such as keyboards, visual displays, and the like, and software, such as a command prompt, a graphical user interface (GUI), menus, and the like.

The capture module 108 facilitates capture of a document image using hardware and/or software. Similarly, the digitization module 110 facilitates creating a digitized image of the captured document. The digitized image of the document is referred to herein as the scanned content. In one embodiment, the scanned content is represented by a scanned content data set 114 that is descriptive of the many individual pixels within the scanned content. The scanned content data set 114 may be stored in the electronic storage device 106, as illustrated, or in another electronic memory device. The electronic storage device 106 or other electronic memory device may be local to the scanner system 100, as shown, or may be located remotely from the scanner system 100.

Where the scanned content is represented by a single color channel, such as black, in the scanned content data set 114, each pixel may have a single tone value that corresponds to the gray level of the associated pixel. Alternatively, where the scanned content is represented by multiple color channels, such as red, green, and blue, each pixel may have a tone value corresponding to the level of each tone of the associated pixel. In one embodiment, the tone values for a tone are between 0 and 255 in an 8-bit system. For example, 0 may represent black, 255 may represent white, and the intermediate values between 0 and 255 may represent a particular level of gray, red, blue, or green. Alternatively, the range of tone values may be less or more than in an 8-bit system.

The segmentation apparatus 112 facilitates automated segmentation of the scanned content into different content types, such as text, line art, and images. As used herein, the term "image" is used distinctly from "scanned content" to denote a content type rather than the graphical representation of the document itself. In certain embodiments, the segmentation apparatus 112 implements a modified content data set (not shown) to facilitate segmentation of the scanned content data set 114. The segmentation apparatus 112 may be local to the scanner system 100, as shown, or may be located remotely from the scanner system 100. One example of a segmentation apparatus 112 is shown and described in more detail with reference to FIG. 2.

Figure 2:
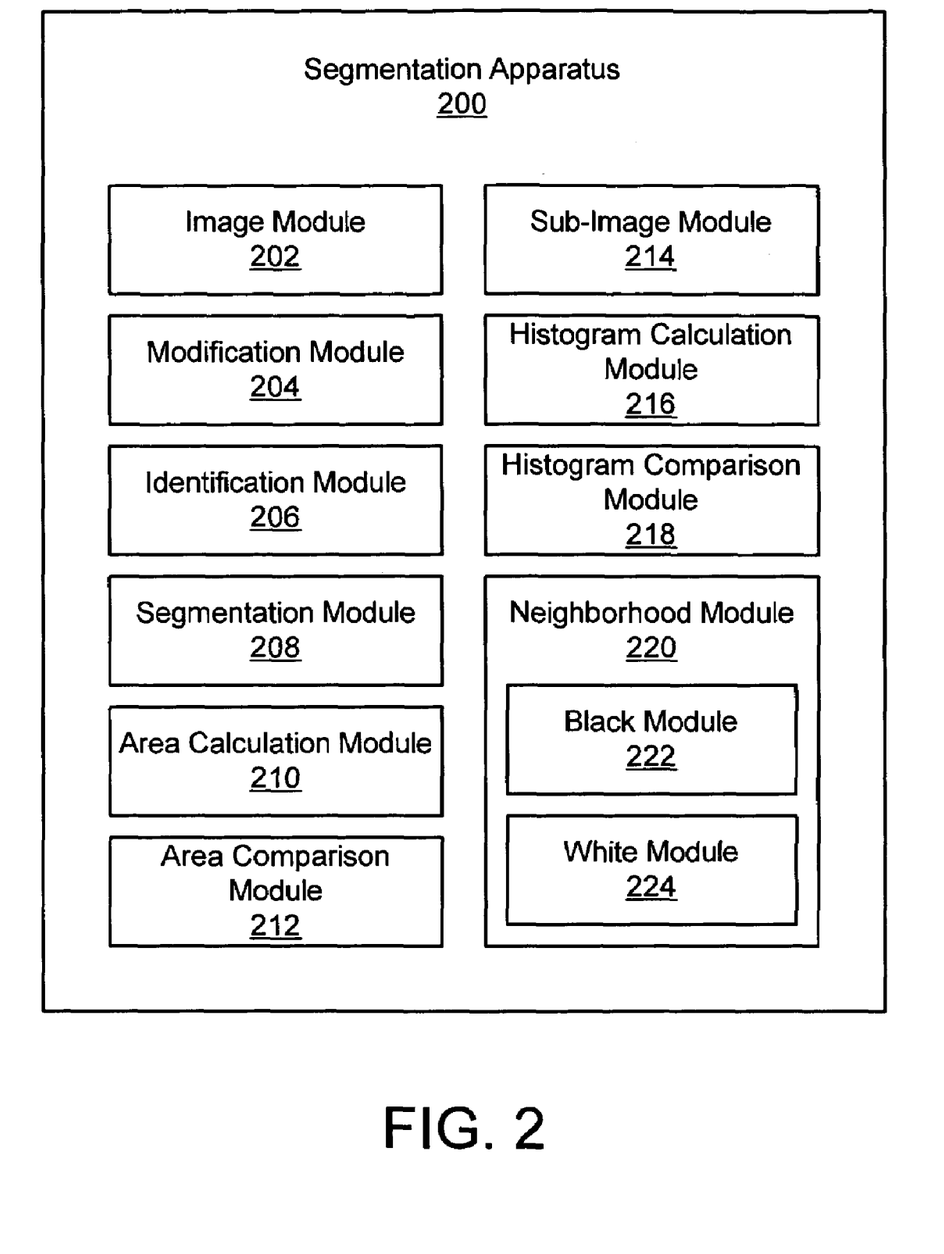
FIG. 2 is a schematic block diagram illustrating one embodiment of a segmentation apparatus.

FIG. 2 depicts one embodiment of a segmentation apparatus 200 that may be substantially similar to the segmentation apparatus 112 of FIG. 1. The illustrated segmentation apparatus 200 includes an image module 202, a modification module 204, an identification module 206, a segmentation module 208, an area calculation module 210, an area comparison module 212, a sub-image module 214, a histogram calculation module 216, a histogram comparison module 218, and a neighborhood module 220. In addition to the description immediately below, embodiments of the functionality of each of these modules is further described with reference to the flow chart diagrams of FIGS. 6-8.

In one embodiment, the image module 202 accesses the scanned content data set 114. The scanned content data set 114 may serve as a basis for the modified content data set, which in turn may be used to identify the potential content types of the scanned content.

In one embodiment, the modification module 204 creates the modified content data set from the scanned content data set 114. In this way, the scanned content data set 114 may remain unchanged while the modified content data set is manipulated to determine the content types of various segments within the scanned content. As used herein, the term "segment" refers to a region of consistent content type within the scanned content. In one embodiment, segments may be identified by a physical separation from other segments of the scanned content. For example, a paragraph of text may be separated by white space from a line art drawing. Similarly, a picture, graph, or chart, or image may be separated from text by spacing or margins within the scanned document. Some examples of content types are shown and described in more detail with reference to FIG. 3.

In order to create the modified content data set, the modification module 204 may apply a mathematical function to the scanned content data set 114. In one embodiment, the modification module 204 applies a sigmoid function to the scanned content data set 114 in order to create the modified content data set. One example of a graph of a sigmoid function is shown and described in more detail with reference to FIG. 4.

In general, a mathematical sigmoid function may facilitate forcing data toward polar extremes. In the case of pixel values, a mathematical sigmoid function may be used to convert the intermediate values of the scanned content data set 114 to new values that are closer to either 0 or 255. In this manner, application of the mathematical sigmoid function to the scanned content data set 114 may facilitate distinguishing between bi-level segments (e.g. text and line art) and halftone segments (e.g. images). One example of a mathematical sigmoid function is the following:

$$f(x) = \left(\frac{x}{128}\right)^n \times 128 \qquad 0 < x < 128$$

$$f(x) = 255 - \left(\frac{255-x}{127}\right)^n \times 127 \quad 128 < x < 255$$

in which n is a parameter that determines the shape of the sigmoid function, x is a pixel value of a pixel of the scanned content data set 114, and f(x) defines a corresponding modified pixel value of a modified pixel of the modified content data set. In alternative embodiments, other variations of mathematical sigmoid functions may be employed. In further embodiments, the modification module 204 may apply other functions similar to a mathematical sigmoid function in order to create the modified content data set.

In one embodiment, the identification module 206 analyzes the modified content data set to identify an individual segment from the scanned content. In one embodiment, the identification module 206 may employ an eight neighbor connectedness determination to identify a content segment of the modified content data set. In general, a determination of eight neighbor connectedness refers to analyzing the neighboring pixels of a selected pixel to determine if the neighboring pixels are connected to the selected pixel. In other words, eight neighbor connectedness may be used to determine the extent to which a segment includes neighboring pixels. When extended through multiple iterations, eight neighbor connectedness facilitates identification of the perimeter of a content segment. Further details regarding eight neighbor connectedness are described with reference to FIG. 5.

In one embodiment, the segmentation module 208 identifies a content segment type of a content segment within the modified content data set. Correspondingly, the segmentation module 208 identifies a content segment type of a content segment of the scanned content data set 114. In one embodiment, the segmentation module 208 identifies the content segment type of the content segment as text in response to a determination that a calculated segment surface area is less than a predefined minimum image surface area.

In another embodiment, if the segment surface area is not less than the predefined minimum image surface area then the segmentation module 208 identifies the content segment type of the content segment as line art in response to a determination that a modified content histogram is similar to a scanned content histogram. Otherwise, the segmentation module 208 may identify the content segment type of the content segment as image in response to a determination that the modified content histogram is not similar to the scanned content histogram.

In one embodiment, the area calculation module 210 calculates a segment surface area of a content segment within the modified content data set. The segment surface area may be calculated in a number of ways. For example the segment surface area of a content segment may be calculated by adding up the total number of "on" pixels within the content segment. The "on" pixels are from a bitmap of a rectangular shape bounding box which is created using the left, right, top, and bottom coordinates of the content segment.

In one embodiment, the area comparison module 212 compares the calculated segment surface area of a content segment to a predefined minimum image surface area. The minimum image surface area may be expressed in terms of pixels, measurements, or any other quantity descriptive of a minimum image size that can be compared against the calculated segment surface area. In one embodiment, use of a predefined minimum image surface area presupposes that all non-textual segments will have a minimum size that is greater than the maximum size of any textual segment. Otherwise, a textual segment with a surface area equal to or greater than the minimum image surface area may be processed as a graphic rather than as text. However, such processing may not be detrimental to the image quality of the oversized text given the ability to identify and process bi-level graphics, as described below.

In one embodiment, the sub-image module 214 defines a sub-image window inclusive of a content segment that is determined to be equal to or larger than the minimum image surface area. In other words, if a content segment is determined to not be text, then the sub-image module 214 may define a sub-image window approximately around the non-textual segment. The sub-image window may be used to identify a portion of the data of the modified content data set or a corresponding portion of the scanned content data set 114. In one embodiment, the sub-image window may be rectangular, having a width and a height approximately equal to, but slightly greater than, the calculated width and height of the selected content segment. One example of a sub-image window is shown and described in more detail with reference to FIG. 3.

In one embodiment, the histogram calculation module 216 calculates a scanned content histogram descriptive of the scanned content data set 114. In particular, the histogram calculation module 216 may calculate a scanned content histogram corresponding to the sub-image window applied to the scanned content data set 114. Similarly, the histogram calculation module 216 may calculate a modified content histogram corresponding to the sub-image window applied to the modified content data set. In general, a histogram is a representation of a frequency distribution of different gray levels of the analyzed data In one embodiment, the histogram comparison module 218 compares the modified content histogram to the scanned content histogram. As described above, similarity between the histograms may be interpreted by the segmentation module 208 to indicate that the corresponding content segment is bi-level line art because a substantially black and white graphic will be affected very little by application of the sigmoid function. Alternatively, dissimilarity between the histograms may be interpreted by the segmentation module 208 to indicate that the corresponding content segment is a halftone image because an image with intermediate tone levels will be distorted by application of the sigmoid function.

In one embodiment, the neighborhood module 220 converts a predefined range of pixel values to a single pixel value within the predefined range. In other words, the neighborhood module 220 assigns a single pixel value to each pixel within a certain group of pixel values. For example, the neighborhood module 220 may identify all of the pixels within the scanned content data set 114 that have a pixel value of between 0 and 10. The neighborhood module 220 then may employ the black module 222 to assign a value of zero to all of those identified pixels. In this way, all of the pixels that are assumed to be black are actually assigned to be black. Similarly, the neighborhood module 220 may identify all of the pixels that have a pixel value of between 245 and 255 and employ the white module 224 to convert them to a value of 255. The neighborhood module 220 also may perform similar operations for color pixels, altering single tones (e.g., red, green, and blue) or a combination of tones. Beneficially, the neighborhood module 220 can increase the dynamic range of the scan data and remove noise.

Figure 3:
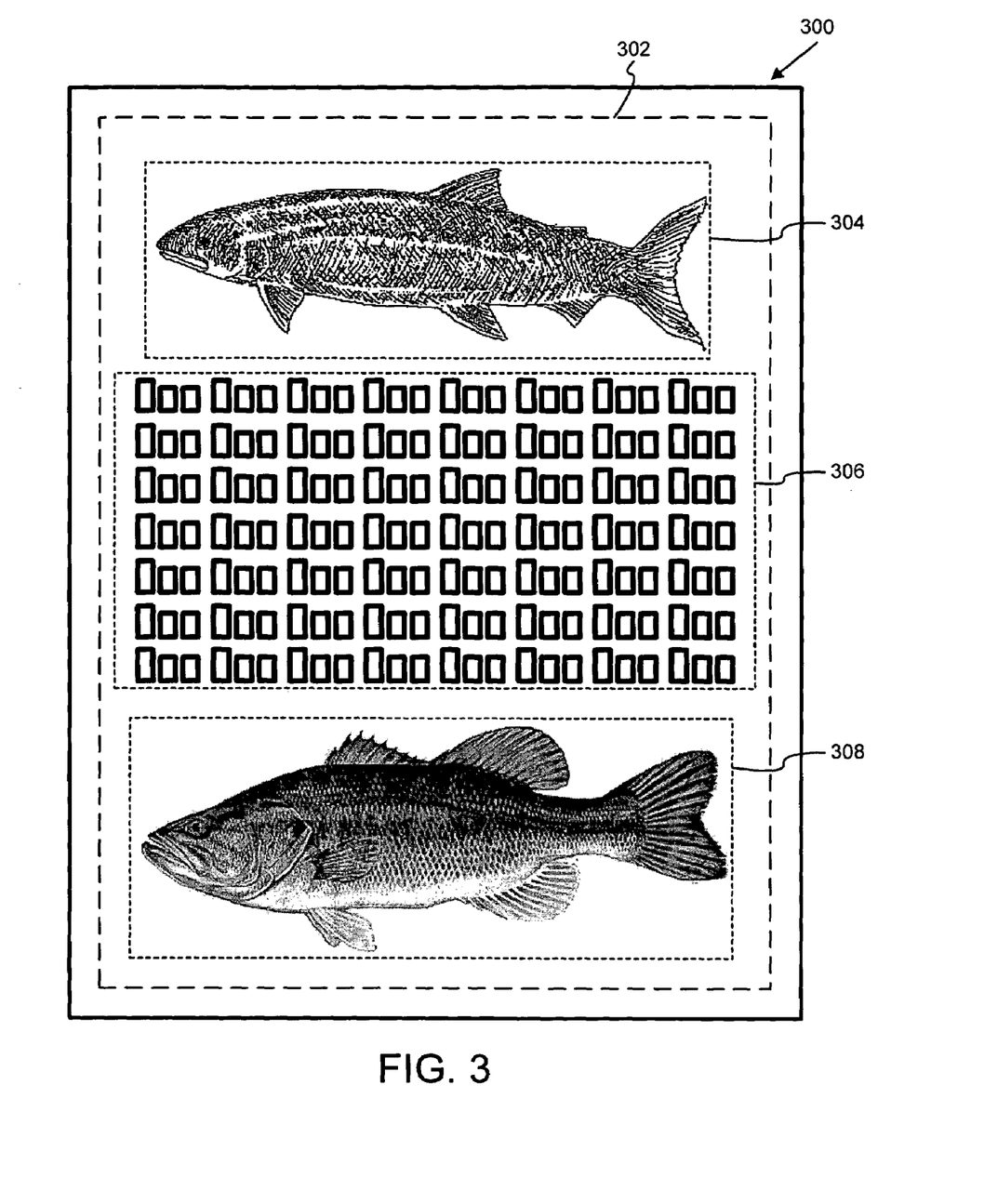
FIG. 3 is a schematic block diagram illustrating one embodiment of a document having various types of content.

FIG. 3 depicts one embodiment of a document 300 having various types of content. The illustrated document 300 represents a scannable document, such as a page from a book, which may be scanned by the scanner system 100. The document 300 is also illustrative of the scanned content 302 (shown by the outermost dashed line) that may be represented by a scanned content data set 114.

The depicted document 300 includes three different content types within the area of the scannable document. The uppermost content segment of the scannable document includes bi-level line art content. The middle content segment of the scannable document includes bi-level text (represented by boxes). The lowermost content segment of the scannable document includes a halftone image.

Figure 6:
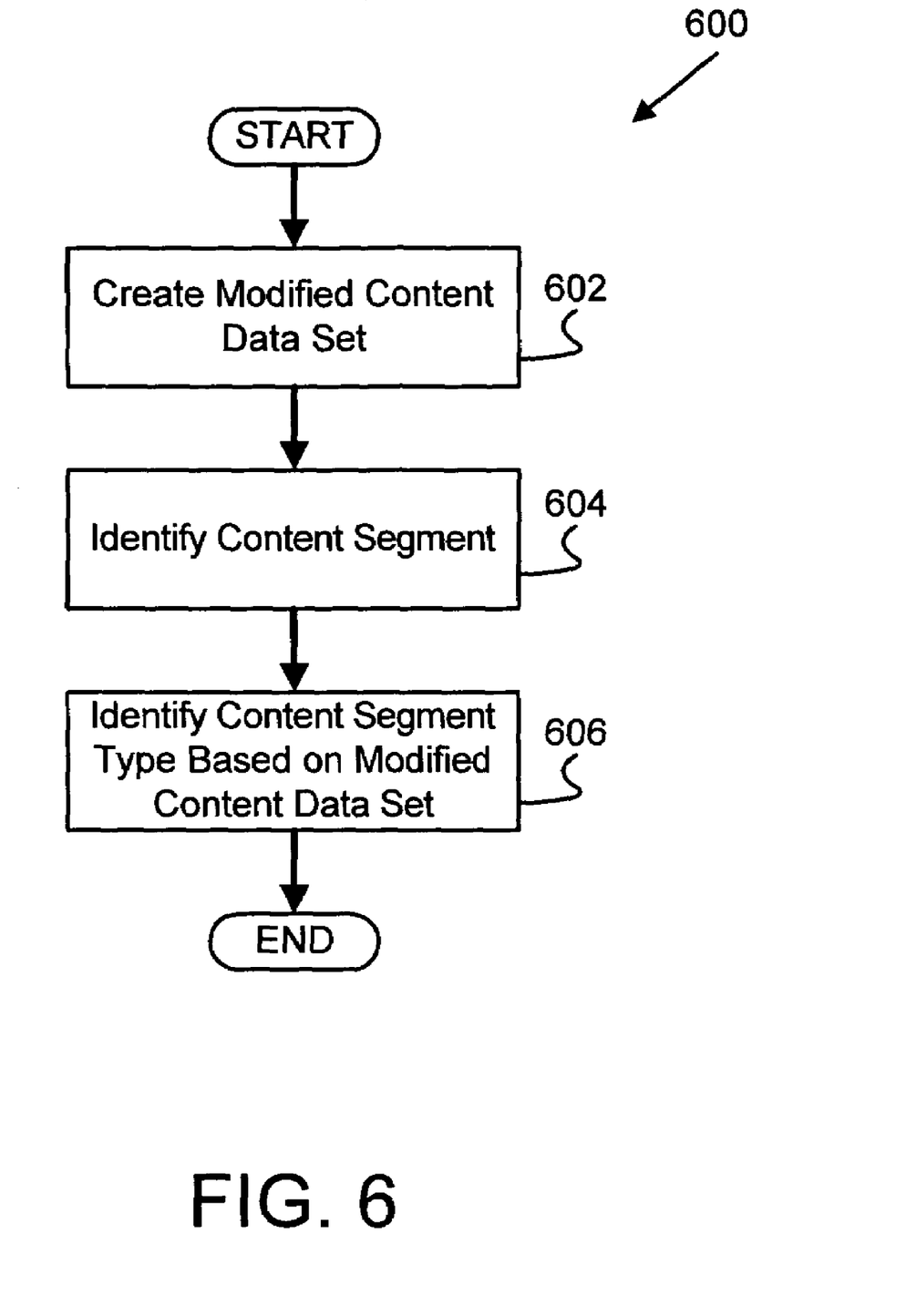
FIG. 6 is a schematic flow chart diagram illustrating one embodiment of a segmentation method.
Figure 7:
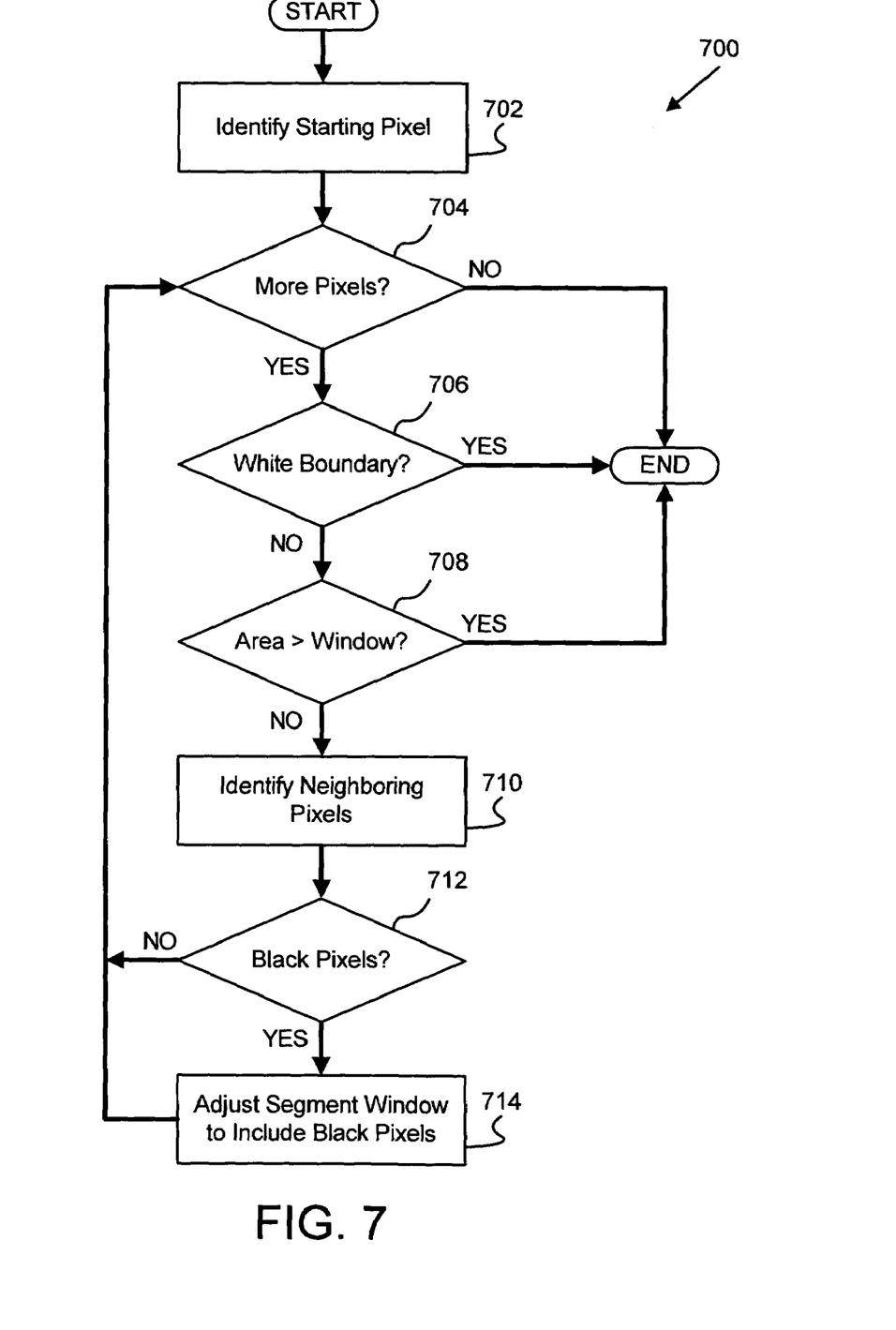
FIG. 7 is a schematic flow chart diagram illustrating one embodiment of a segment identification method.
Figure 8:
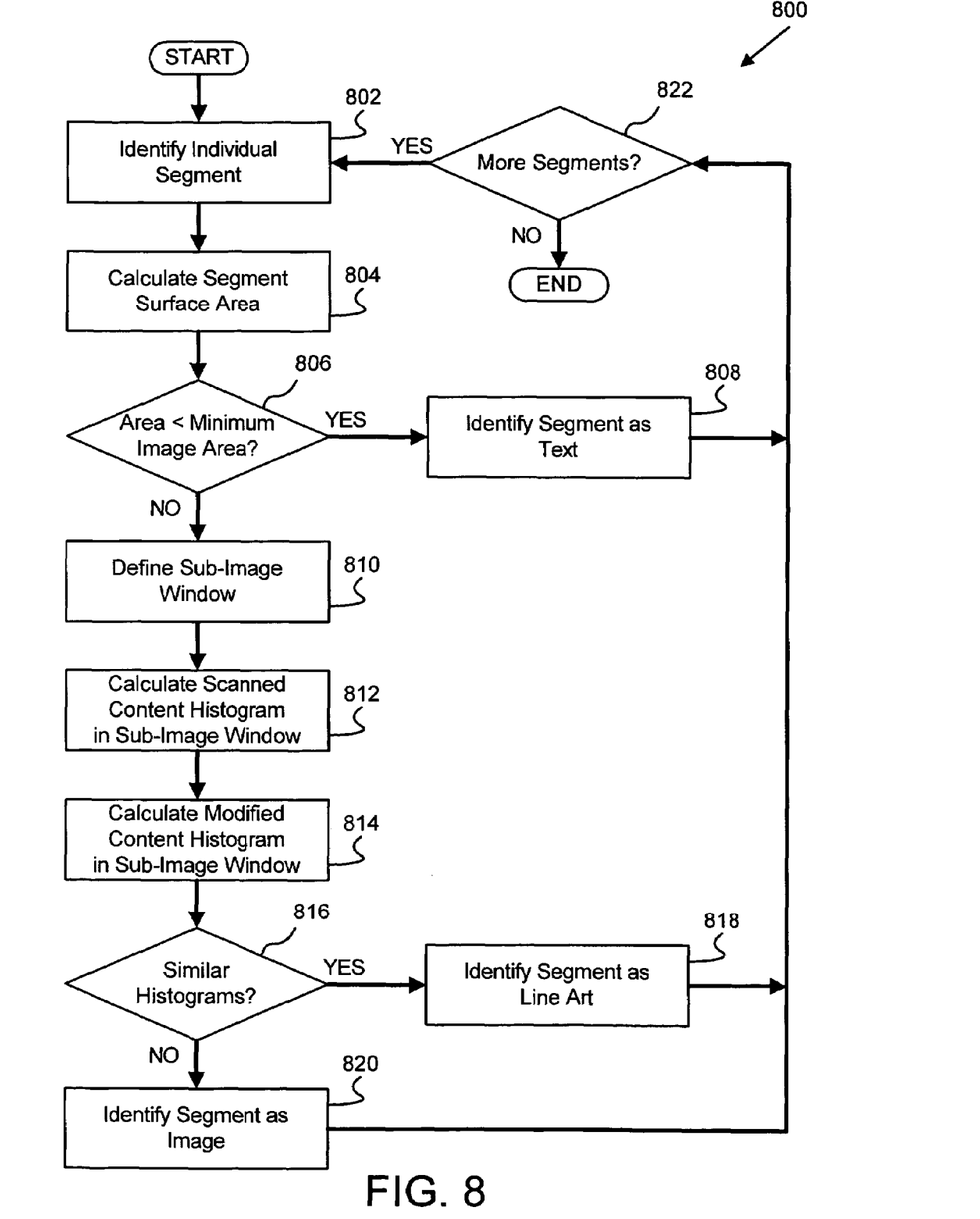
FIG. 8 is a schematic flow chart diagram illustrating one embodiment of a type identification method.

As described herein, the segmentation apparatus 200 identifies the various content segments of the scanned content data set 114 representative of the scanned content. The segmentation apparatus 200 may employ a modified content data set to facilitate such identification. The segmentation apparatus 200 also identifies the content type of each content segment. In the depicted embodiment, the scanned content data set 114 includes three content segments. The line art content corresponds to a line art segment 304. The text content corresponds to a text segment 306. In another embodiment, each textual character may be defined as an individual text segment 306. The image content corresponds to an image segment 308. The flow chart diagrams of FIGS. 6-8 provide further details of one embodiment of the operations that the segmentation apparatus 200 may perform to identify each content segment and its content type.

Figure 4:
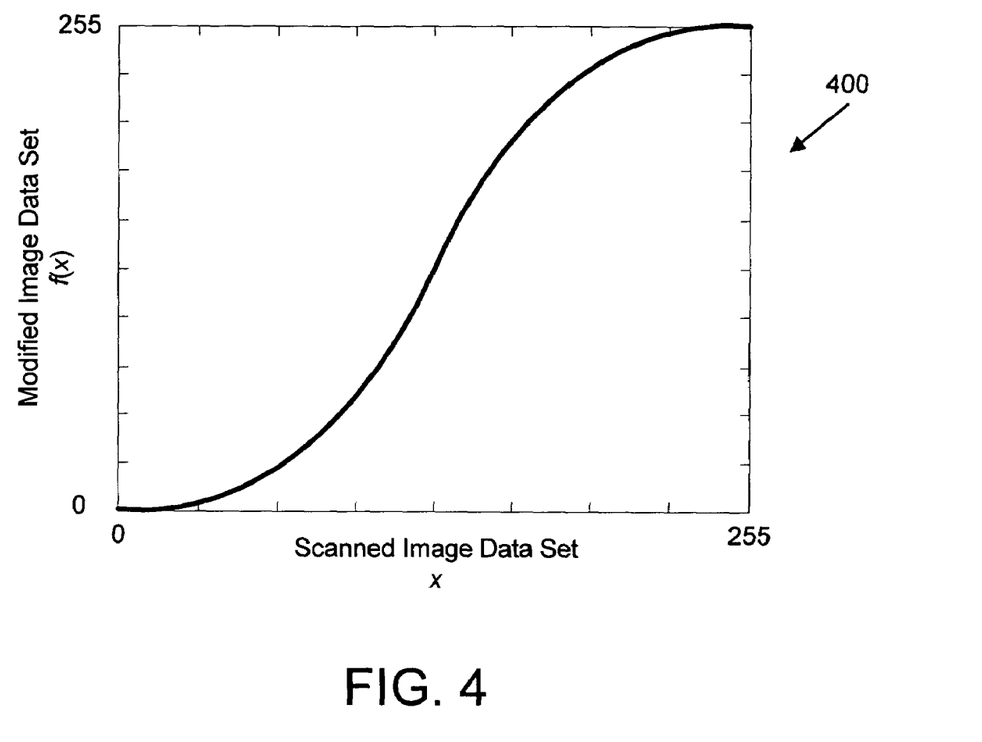
FIG. 4 is a schematic graphical diagram illustrating one embodiment of a sigmoid function.

FIG. 4 depicts one embodiment of a mathematical sigmoid function. The illustrated graphical representation 400 of a sigmoid function is only one exemplary representation. Other types of sigmoid functions may produce representations that are more or less linear, depending in part on the constants used. Although specific examples of mathematical sigmoid functions are given above, with reference to the description of FIG. 2, other mathematical functions may be employed having fewer or more constants or other mathematical terms. Additionally, some mathematical sigmoid functions may be adjusted linearly or otherwise to accommodate a range of pixel values between 0 and 255.

The illustrated sigmoid function creates a non-linear relationship between the pixel values of the scanned content data set 114 and the modified content data set. Given the exemplary sigmoid function shown, a pixel value for a pixel of the modified content data set may be adjusted closer to either one of the polar extremes compared to the corresponding pixel of the scanned content data set 114.

For each pixel value of the scanned content data set 114 that is below approximately the value 128, the value of the corresponding pixel of the modified content data set may be adjusted closer to the value zero. Alternatively, for each pixel value of the scanned content data set 114 that is above approximately the value 128, the value of the corresponding pixel of the modified content data set may be adjusted closer to the value 255. In one embodiment, this modification creates a modified content data set that artificially extends the dynamic pixel value range of a scanner (typically between about 20 and 230 for an 8-bit scanner) to a greater range (e.g. between 0 and 255).

Figure 5:
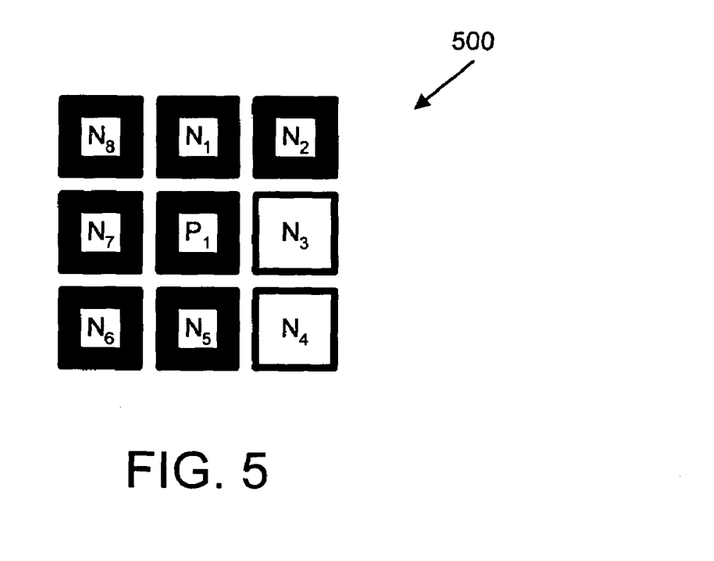
FIG. 5 is a schematic block diagram illustrating one embodiment of a pixel array.

FIG. 5 depicts one embodiment of a pixel array 500 that is illustrative of eight neighbor connectedness. The pixel array 500 includes a center pixel $P_1$ and eight neighboring pixels $N_1$ through $N_8$. The selected pixel $P_1$ is substantially black. The concept of eight neighbor connectedness is used to determine which of the neighboring pixels $N_1$ through $N_8$ are also substantially black (assuming the scanned content includes black printing against a light background).

In one embodiment, the identification module 206 analyzes each of the neighboring pixels $N_1$ through $N_8$ and determines which pixels are similar to the selected pixel $P_1$. The similarity may be determined by comparing the pixel value of each pixel. Alternatively, the similarity may be determined if the pixels are within a predefined range of pixel values. For example, any pixels having a pixel value of between 230 and 255 may be determined to be similar. In another example, any pixels having a pixel value less than 20 may be determined to be similar. In the illustrated embodiment, the identification module 206 may determine that neighboring pixels $N_1$, $N_2$, and $N_5$ through $N_8$ are similar to the selected pixel $P_1$.

FIG. 6 depicts one embodiment of a segmentation method 600 that may be performed by the segmentation apparatus 200 in conjunction with the scanner system 100. The illustrated segmentation method 600 begins and the modification module 204 creates 602 a modified content data set corresponding to a scanned content data set 114. The modified content data set may be stored on the electronic storage device 106 or on another electronic memory device. In one embodiment, the modification module 204 applies a sigmoid function to the scanned content data set 114 in order to create the modified content data set, as described above.

Using the modified content data set, the identification module 206 then identifies 604 a content segment within the modified content data set. Alternatively, the identification module 206 may identify 604 all of the content segments within the modified content data set. After the identification module 206 identifies a content segment, the segmentation module 208 then identifies 606 a content segment type based on the content of the identified content segment. In one embodiment, the segmentation module 208 identifies the content segment type as text, line art, or image. Alternatively, the segmentation module 608 may identify the content more generically (e.g. text or picture, graphic, or bi-level or halftone) or more specifically (e.g. sub-classes of text, line art, images, etc.). The depicted segmentation method 600 then ends.

FIG. 7 depicts one embodiment of a segment identification method 700 that is given by way of example of the segment identification operation 604 of the segmentation method 600 of FIG. 6. The illustrated segment identification method 700 begins and the identification module 206 identifies 702 a starting pixel, such as the selected pixel $P_1$ described with reference to the pixel array 500 of FIG. 5.

The identification module 206 then determines 704 if there are any more pixels that can be processed. If so, the identification module 206 determines 706 if a white boundary (assuming a substantially black content segment) has been detected around the combined segment pixels. If such a boundary has not been established, the identification module 206 determines 708 if the area of processed pixels exceeds a window size that defines the total processing area, which corresponds with the scanned content 302.

The identification module 206 then identifies 710 the neighboring pixels of the selected pixel. In one embodiment, the identification module 206 uses eight neighbor connectedness to identify 710 the neighboring pixels. For the identified neighboring pixels, the identification module 206 determines 712 which pixels are substantially black and adjusts 714 a segment window that defines the content segment. As more black pixels are identified as belonging to a particular content segment, the corresponding segment window is expanded 714 to include the identified pixels.

The illustrated segment identification method 700 iteratively continues to select pixels within the segment until a termination criterion is satisfied. The depicted segment identification method 700 ends when the identification module 206 determines 704 that all of the pixels have been processed, determines 706 that a white boundary has been established for the segment, or determines 708 that the processed area exceeds the pixel processing window.

FIG. 8 depicts one embodiment of a type identification method 800 that is given by way of example of the identification operation 606 of the segmentation method 600 of FIG. 6. The illustrated type identification method 800 begins and the identification module 206 identifies 802 one of the content segments, which may have been identified according to the segment identification method 700 described above. The area calculation module 210 then calculates 804 the segment surface area of selected content segment. The area comparison module 212 then compares the calculated segment surface area to a predefined minimum image surface area to determine 806 if the segment surface area is less than the minimum image surface area. If the segment surface area is less than the minimum image surface area, then the segmentation module 208 identifies 808 the segment type as text content.

If the segment surface area is not less than the minimum image surface area, then the sub-image module 214 defines 810 a sub-image window surrounding the segment. The histogram calculation module 216 then calculates 812 a scanned content histogram of the scanned content data set 114 corresponding to the sub-image window. The histogram calculation module 216 also calculates 814 a modified content histogram of the modified content data set corresponding to the sub-image window.

The histogram comparison module 218 subsequently compares the modified content histogram and the scanned content histogram to determine 816 if the histograms are similar. If the histograms are determined 816 to be similar, then the segmentation module 208 identifies 818 the segment as line art content. Otherwise, if the histograms are determined 816 to be dissimilar, then the segmentation module 208 identifies 820 the segment as image content.

After identifying the segment as either text, line art, or image content, the segmentation apparatus 200 determines 822 if additional segments need to be processed and, if so, iteratively returns to select 802 a subsequent content segment. Otherwise, the depicted type identification method 800 ends.

Advantageously, the presented embodiments automatically identify segments of a scanned content and identify the content type of each content segment. Identification of the content types of the individual segments facilitates appropriate processing of each segment according to its content type. Additionally, such scanning segmentation increases the quality of scanning digitization and reproduction.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to identify content within a scanned image, the system comprising:
    a scanner configured to capture a scanned content data set;
    an electronic storage coupled with the scanner and configured to store the scanned content data set; and
    a segmentation apparatus coupled with the electronic storage and configured to create a modified content data set through application of a sigmoid function to the scanned content data set, to identify a content segment within the modified content data set by determining eight neighbor connectedness with a substantially black pixel to identify the pixels within the content segment, to identify a content segment type of the content segment, to calculate a segment surface area of the content segment within the modified content data set, and to compare the segment surface area to a minimum image surface area.

2. The system of claim 1 wherein the segmentation apparatus is further configured to identify the content segment type of the content segment as text in response to a determination that the segment surface area is less than the minimum image surface area.

3. The system of claim 1 wherein the segmentation apparatus is further configured to define a sub-image window inclusive of the content segment in response to a determination that the content segment is not text.

4. The system of claim 3 wherein the segmentation apparatus is further configured to calculate a scanned content histogram corresponding to the sub-image window, to calculate a modified content histogram corresponding to the sub-image window, and to compare the modified content histogram to the scanned content histogram.

5. The system of claim 4 wherein the segmentation apparatus is further configured to identify the content segment type of the content segment as line art in response to a determination that the modified content histogram is similar to the scanned content histogram.

6. The system of claim 4 wherein the segmentation apparatus is further configured to identify the content segment type of the content segment as an image in response to a determination that the modified content histogram is not similar to the scanned content histogram.

7. The system of claim 1 wherein the segmentation apparatus is further configured to convert a predefined range of pixel values to a single pixel value within the predefined range of pixel values.

8. The system of claim 1 wherein the modified content data set comprises data corresponding to at least one color channel.

9. A system configured to identify content within a scanned image, the system comprising:
a scanner configured to capture and digitize scanned content having a content segment;
an electronic data storage device configured to store a scanned content data set descriptive of the digitized scanned content; and
a segmentation apparatus configured to identify a content segment type of the content segment, and further configured to create a modified content data set from the scanned content data set, the modified content data set corresponding to a modified content histogram that is more polarized than a scanned content histogram corresponding to the scanned content data set and wherein the modified content data set relates to the scanned content data set according to a sigmoid function substantially similar to the following:

$$f(x) = \left(\frac{x}{128}\right)^n \times 128 \qquad 0 < x < 128$$

$$f(x) = 255 - \left(\frac{255-x}{127}\right)^n \times 127 \quad 128 < x < 255$$

in which n is a parameter that determines the shape of the sigmoid function, x is a pixel value of a pixel of the scanned content data set, and f(x) defines a corresponding modified pixel value of a modified pixel of the modified content data set.

10. A computer readable medium tangibly embodying programmed instructions which, when executed by a computer system, are operable for performing a method of identifying content within a scanned image, the method comprising:
creating a modified content data set through application of a sigmoid function to a scanned content data set;
identifying a content segment within the modified content data set by determining eight neighbor connectedness with a substantially black pixel to identify the pixels within the content segment;
identifying a content segment type of the content segment;
calculating a segment surface area of a content segment within the modified content data set; and
comparing the segment surface area to a minimum image surface area.

11. The computer readable medium of claim 10, the method further comprising:
identifying the content segment type of the content segment as text in response to a determination that the segment surface area is less than the minimum image surface area.

12. The computer readable medium of claim 10, the method further comprising:
defining a sub-image window inclusive of the content segment in response to a determination that the content segment is not text;
calculating a scanned content histogram corresponding to the sub-image window and a modified content histogram corresponding to the sub-image window; and
comparing the modified content histogram to the scanned content histogram.

13. The computer readable medium of claim 12, the method further comprising:
identifying the content segment type of the content segment as line art in response to a determination that the modified content histogram is similar to the scanned content histogram; and
identifying the content segment type of the content segment as an image in response to a determination that the modified content histogram is not similar to the scanned content histogram.

14. The computer readable medium of claim 10, the method further comprising:
converting a predefined range of pixel values to a single pixel value within the predefined range of pixel values.

15. A computer implemented method of identifying content within a scanned image, the method comprising:
creating a modified content data set using a computer through application of a sigmoid function to a scanned content data set;
identifying a content segment within the modified content data set using the computer by determining eight neighbor connectedness with a substantially black pixel to identify the pixels within the content segment;
identifying a content segment type of the content segment using the computer;
calculating a segment surface area of a content segment within the modified content data set using the computer; and
comparing the segment surface area to a minimum image surface area using the computer.

16. The computer implemented method of claim 15 further comprising:
identifying the content segment type of the content segment as text in response to a determination using the computer that the segment surface area is less than the minimum image surface area.

17. The computer implemented method of claim 15, further comprising identifying the content segment type of the content segment as line art in response to a determination using the computer that a modified content histogram is similar to a scanned content histogram.

18. The computer implemented method of claim 15, further comprising identifying the content segment type of the content segment as an image in response to a determination using the computer that a modified content histogram is not similar to a scanned content histogram.

* * * * *